(12) United States Patent
Weller et al.

(10) Patent No.: US 8,878,882 B2
(45) Date of Patent: Nov. 4, 2014

(54) SEGMENTED EDGE-LIT BACKLIGHT ASSEMBLY FOR A DISPLAY

(75) Inventors: Andrew D. Weller, Holland, MI (US); John A. VanderPloeg, Zeeland, MI (US); Ethan J. Lee, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 337 days.

(21) Appl. No.: 13/482,488

(22) Filed: May 29, 2012

(65) Prior Publication Data

US 2013/0321496 A1   Dec. 5, 2013

(51) Int. Cl.
G09G 3/36 (2006.01)
F21V 8/00 (2006.01)
G02F 1/1335 (2006.01)
G09G 5/10 (2006.01)

(52) U.S. Cl.
USPC .......................................................... 345/694

(58) Field of Classification Search
CPC ..... G09G 3/3644; G09G 3/3666; G09G 5/10; G09G 5/14
USPC ............. 345/1.1–1.3, 204–214; 348/148, 739
See application file for complete search history.

(56) References Cited

U.S. PATENT DOCUMENTS

| | | | |
|---|---|---|---|
| 5,105,127 A | 4/1992 | Lavaued et al. |
| 5,285,060 A | 2/1994 | Larson et al. |
| 5,289,321 A | 2/1994 | Secor |
| 5,574,443 A | 11/1996 | Hsieh |
| 5,754,159 A | 5/1998 | Wood et al. |
| 6,222,457 B1 | 4/2001 | Mills et al. |
| 6,356,376 B1 | 3/2002 | Tonar et al. |
| 6,550,949 B1 | 4/2003 | Bauer et al. |
| 6,690,268 B2 | 2/2004 | Schofield et al. |
| 6,700,692 B2 | 3/2004 | Tonar et al. |
| 6,864,930 B2 * | 3/2005 | Matsushita et al. ............. 349/65 |
| 7,286,193 B2 | 10/2007 | Yoo et al. |
| 7,324,261 B2 | 1/2008 | Tonar et al. |

(Continued)

FOREIGN PATENT DOCUMENTS

| | | |
|---|---|---|
| JP | 7-2636928 | 10/1995 |
| JP | 11-078693 | 3/1999 |

OTHER PUBLICATIONS

Silviu Palalau et al., "FPD Evaluation for Automotive Application," Vehicle Displays, The Society for Information Display, 1995, pp. 97-103.

(Continued)

*Primary Examiner* — Andrew Sasinowski
(74) *Attorney, Agent, or Firm* — Price Heneveld LLP; Scott P. Ryan (57) ABSTRACT

An edge-lit backlight assembly is provided for backlighting a display. The backlight assembly may include: a light guide having a first segment and a second segment disposed within a common plane; a first light emitting diode disposed along an edge of the first segment of the light guide such that light emitted from the first light emitting diode propagates through the first segment; and a second light emitting diode disposed along an edge of the second segment of the light guide such that light emitted from the second light emitting diode propagates through the second segment. The first segment of the light guide is at least partially optically isolated from the second segment such that light emitted from the first light emitting diode is at least partially blocked from propagating through the second segment.

24 Claims, 8 Drawing Sheets

(56) References Cited

U.S. PATENT DOCUMENTS

| | | | |
|---|---|---|---|
| 7,329,850 B2 | 2/2008 | Drummond et al. | |
| 7,370,983 B2 | 5/2008 | DeWind et al. | |
| 7,372,611 B2 | 5/2008 | Tonar et al. | |
| 7,488,080 B2 | 2/2009 | Skiver et al. | |
| 7,490,007 B2 | 2/2009 | Taylor et al. | |
| 7,502,156 B2 | 3/2009 | Tonar et al. | |
| 7,540,620 B2 | 6/2009 | Weller et al. | |
| 7,567,291 B2 | 7/2009 | Bechtel et al. | |
| 7,586,666 B2 | 9/2009 | McCabe et al. | |
| 7,597,469 B2 | 10/2009 | Nishigaki | |
| 7,619,508 B2 | 11/2009 | Lynam et al. | |
| 7,667,579 B2 | 2/2010 | DeLine et al. | |
| 7,683,768 B2 | 3/2010 | Lindahl et al. | |
| 7,726,822 B2 | 6/2010 | Blank et al. | |
| 7,734,392 B2 | 6/2010 | Schofield et al. | |
| 7,771,061 B2 | 8/2010 | Varaprasad et al. | |
| 7,777,611 B2 | 8/2010 | Desai | |
| 7,826,123 B2 | 11/2010 | McCabe et al. | |
| 7,855,755 B2 | 12/2010 | Weller et al. | |
| 7,864,136 B2 * | 1/2011 | Matthies et al. | 345/1.3 |
| 8,004,741 B2 | 8/2011 | Tonar et al. | |
| 8,169,684 B2 | 5/2012 | Bugno et al. | |
| 2001/0035853 A1 | 11/2001 | Hoelen et al. | |
| 2003/0043480 A1 | 3/2003 | Burgner | |
| 2008/0068520 A1 | 3/2008 | Minikey, Jr. et al. | |
| 2008/0284929 A1 | 11/2008 | Kimura | |
| 2009/0096937 A1 * | 4/2009 | Bauer et al. | 348/739 |
| 2010/0045899 A1 | 2/2010 | Ockerse | |
| 2010/0201816 A1 * | 8/2010 | Lee et al. | 348/148 |
| 2011/0069043 A1 * | 3/2011 | Lee et al. | 345/204 |
| 2011/0317242 A1 | 12/2011 | Tonar et al. | |

OTHER PUBLICATIONS

Phil Zuk et al., "Flat Panel Display Applications in Agriculture Equipment," Flat Panel & Vehicle Display '98, The Society for Information Display, 1998, pp. 125-130.

Meera Vijan et al., "A 1.7-Mpixel Full-Color Diode Driven AM-LCD," SID 90 Digest, The Society for Information Display, First Edition, May 1990, pp. 530-533.

Mark R. Vincen, "The Automotive Challenge to Active Matrix LCD Technology," Vehicle Displays '98, The Society for Information Display, 1996, pp. 17-21.

Kim M. Corsi et al., "Reconfigurable Displays Used as Primary Automotive Instrumentation," SAE Technical Paper Series, 890282, Feb. 1989, pp. 13-18.

Robert W. Schumacher, "Automotive Display Trends," SID 96 Digest, The Society for Information Display, 1997, pp. 1-6.

Peter M. Knoll, "The Use of Displays in Automotive Applications," Journal of the SID 5/3, The Society for Information Display, 1997, pp. 165-172, 315-316.

Robert L. Donofrio, "Looking Beyond the Dashboard," Information Display Jul. 2002, The Society for Information Display, 2002, pp. 30-34.

Karl E. Stone, "Automotive Display Specifications," Vehicle Displays, The Society for Information Display, 1995, pp. 93-96.

Glenn J. Adler, "A New Automotive AMLCD Module," Vehicle Displays, The Society for Information Display, 1995, pp. 67-71.

Tina Brunetti Sayer et al., "In-Vehicle Displays for Crash Avoidance and Navigation Systems," Vehicle Displays '98, The Society for Information Display, 1996, pp. 39-42.

Peter M. Knoll et al., "Application of Graphic Displays in Automobiles," SID 87 Digest, 1987, pp. 41-44.

Toshiyuki Terada et al., "Development of Central Information Display of Automotive Application," SID 89 Digest, 1989, pp. 192-195.

S.V. Thomsen et al., "AMLCD Design Considerations for Avionics and Vetronics Applications," Flat Panel & Vehicle Display '98, The Society for Information Display, 1998, pp. 139-145.

Peter M. Knoll, et al., "Conception of an Integrated Driver Information System," SID 90 Digest, The Society for Information Display, First Edition, May 1990, pp. 126-129.

Mark R. Vincen, "An Analysis of Direct-View FPDs for Automotive Multi-Media Applications," Vehicle Displays & Microsensors' 99, The Society for Information Display, 1999, pp. 39-46.

* cited by examiner

SEGMENTED EDGE-LIT BACKLIGHT ASSEMBLY FOR A DISPLAY

FIELD OF THE INVENTION

The present invention generally relates to a backlight assembly for a display. More specifically, it relates to an edge-lit backlight assembly. According to at least one embodiment, the present invention relates to a display having an edge-lit backlight assembly, which according to another embodiment, may be used as a display for a vehicle.

SUMMARY OF THE INVENTION

According to one embodiment, an edge-lit backlight assembly is provided for backlighting a display. The backlight assembly comprises: a light guide having a first segment and a second segment disposed within a common plane; a first light source disposed along an edge of the first segment of the light guide such that light emitted from the first light source propagates through the first segment; and a second light source disposed along an edge of the second segment of the light guide such that light emitted from the second light source propagates through the second segment. The first segment of the light guide is at least partially optically isolated from the second segment such that light emitted from the first light source is at least partially blocked from propagating through the second segment.

According to another embodiment, a display is provided that comprises: a display element having a display area from which information is displayed, a select portion of the display area for displaying select information; and an edge-lit backlight assembly for backlighting the display element. The edge-lit backlight assembly comprises: a light guide having a first segment and a second segment, where the first segment backlights the select portion of the display area and the second segment backlights a remaining portion of the display area; a first light emitting diode disposed along an edge of the first segment of the light guide such that light emitted from the first light emitting diode propagates through the first segment and backlights the select portion of the display area; and a plurality of second light emitting diodes disposed along an edge of the second segment of the light guide such that light emitted from the second light emitting diodes propagates through the second segment and backlights the remaining portion of the display area. The first segment of the light guide is at least partially optically isolated from the second segment such that light emitted from the first light emitting diode is at least partially blocked from propagating through the second segment and thereby at least partially blocked from backlighting the remaining portion of the display area.

According to another embodiment, a display for a vehicle is provided that comprises: a display element having a display area from which video images are displayed over the full display area, a select portion of the display area for displaying select information; and an edge-lit backlight assembly for backlighting the display element. The edge-lit backlight assembly comprises: a light guide having a first segment and a second segment, where the first segment backlights the select portion of the display area and the second segment backlights a remaining portion of the display area; at least one first light emitting diode disposed along an edge of the first segment of the light guide such that light emitted from the at least one first light emitting diode propagates through the first segment and backlights the select portion of the display area; and a plurality of second light emitting diodes disposed along an edge of the second segment of the light guide such that light emitted from the second light emitting diodes propagates through the second segment and backlights the remaining portion of the display area. The first segment of the light guide is at least partially optically isolated from the second segment such that light emitted from the at least one first light emitting diode is at least partially blocked from propagating through the second segment and thereby at least partially blocked from backlighting the remaining portion of the display area. When video images are displayed over the full display area, the at least one first light emitting diode and the plurality of second light emitting diodes are energized to backlight all of the display area. When the select information is displayed on the select portion of the display area, the at least one first light emitting diode is energized to backlight the select portion while the plurality of second light emitting diodes are de-energized such that the remaining portion is not backlit.

These and other features, advantages, and objects of the present invention will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Figure 1:
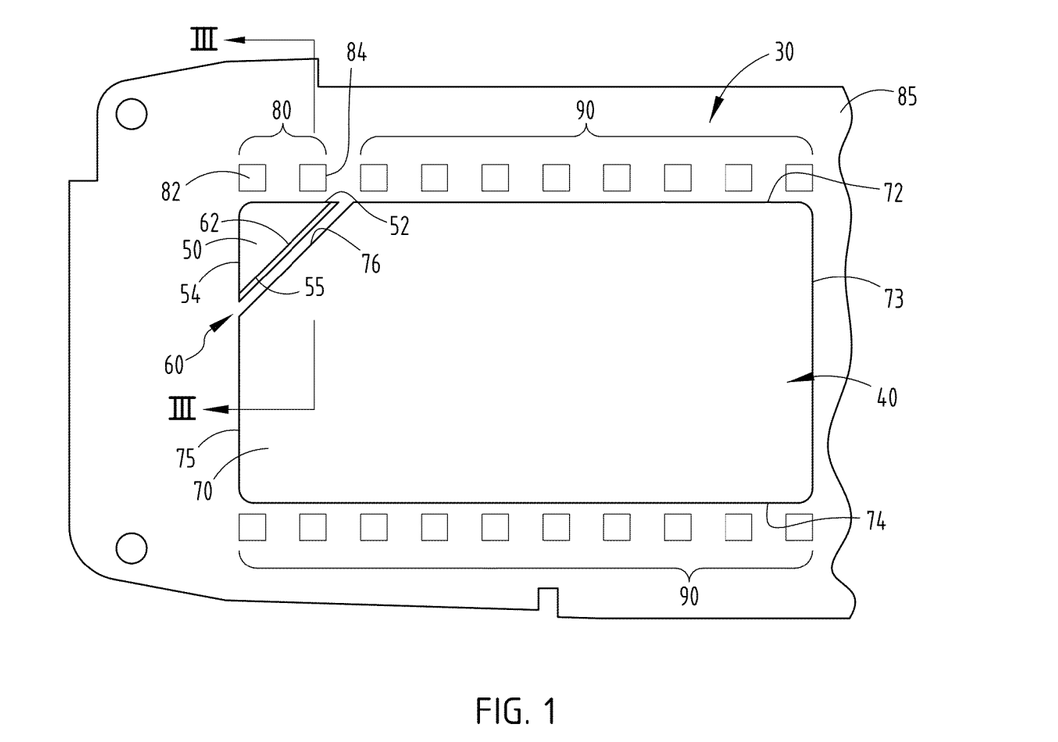
FIG. 1 is a top plan view of a segmented edge-lit backlight assembly constructed in accordance with an embodiment of the present invention.
Figure 2:
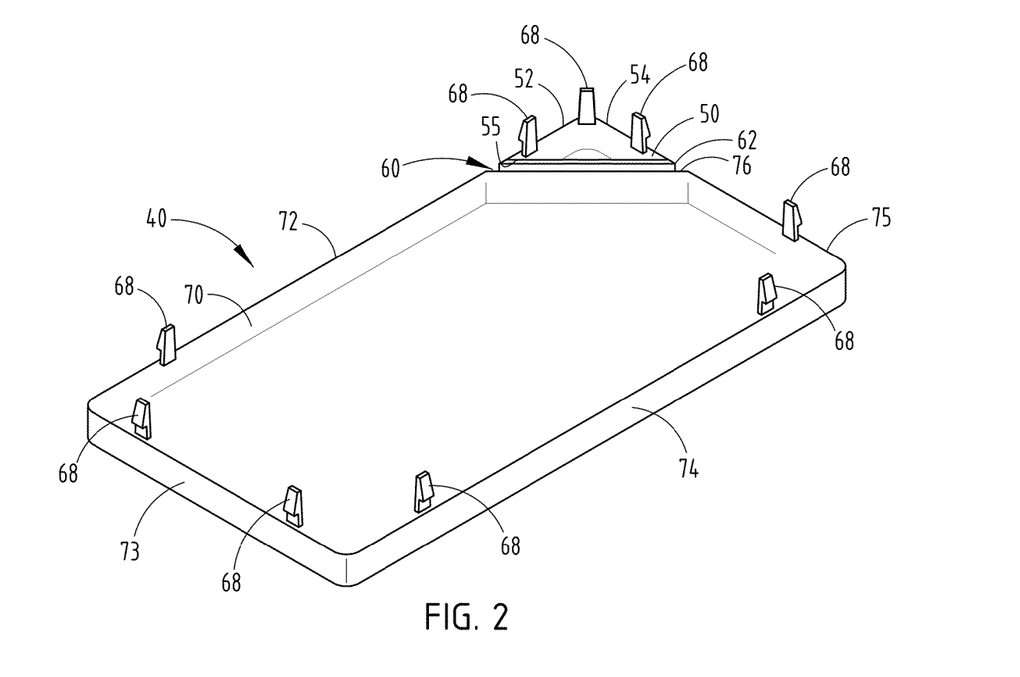
FIG. 2 is a perspective view of the bottom of the light guide used in the backlight assembly shown in FIG. 1.
Figure 4:
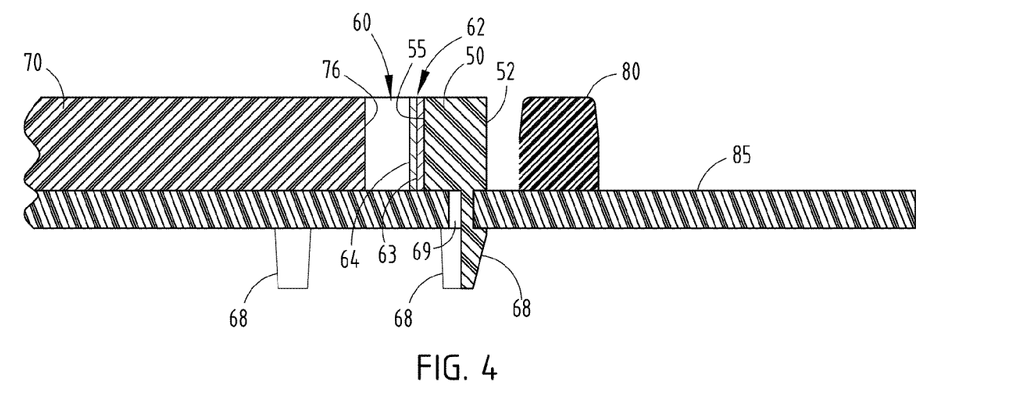
FIG. 4 is a cross-sectional view of a portion of the backlight assembly according to an alternate embodiment.

FIGS. 1 and 2 show an example of a first embodiment of an edge-lit backlight assembly 30 that is provided for backlighting a display (100 of FIG. 4). Backlight assembly 30 may include: a light guide 40 having a first segment 50 and a second segment 70 disposed within a common plane; a first light source, which may be a light emitting diode (LED) 80, disposed along an edge 52 of first segment 50 such that light emitted from first light source 80 propagates through first segment 50; and a second light source, which also may be an LED 90, disposed along an edge 72 (or optionally more than one edge such as edge 74) of second segment 70 such that light emitted from second light source 90 propagates through second segment 70. As explained further below, first segment 50 is at least partially optically isolated from second segment 70 such that light emitted from first light source 80 is at least partially blocked from propagating through second segment 70. To better understand the features and advantages of the edge-lit backlight assembly, and before describing further details of edge-lit backlight assembly 30, a brief description is provided of a display 100 (FIG. 4) incorporating the edge-lit backlight assembly 30, as well as a specific implementation of the display in a vehicle (particularly in a rearview assembly 110 (FIGS. 7-9) of a vehicle).

FIG. 4 shows an example of a display 100, which includes the aforementioned edge-lit backlight assembly 30 and a display element 102. Display element 102 may be any form of display that would benefit from backlighting, including, but not limited to liquid crystal displays (LCDs). In this particular example, display 100 is configured to be implemented in a rearview assembly 110 as illustrated in FIGS. 7-9.

Figure 7:
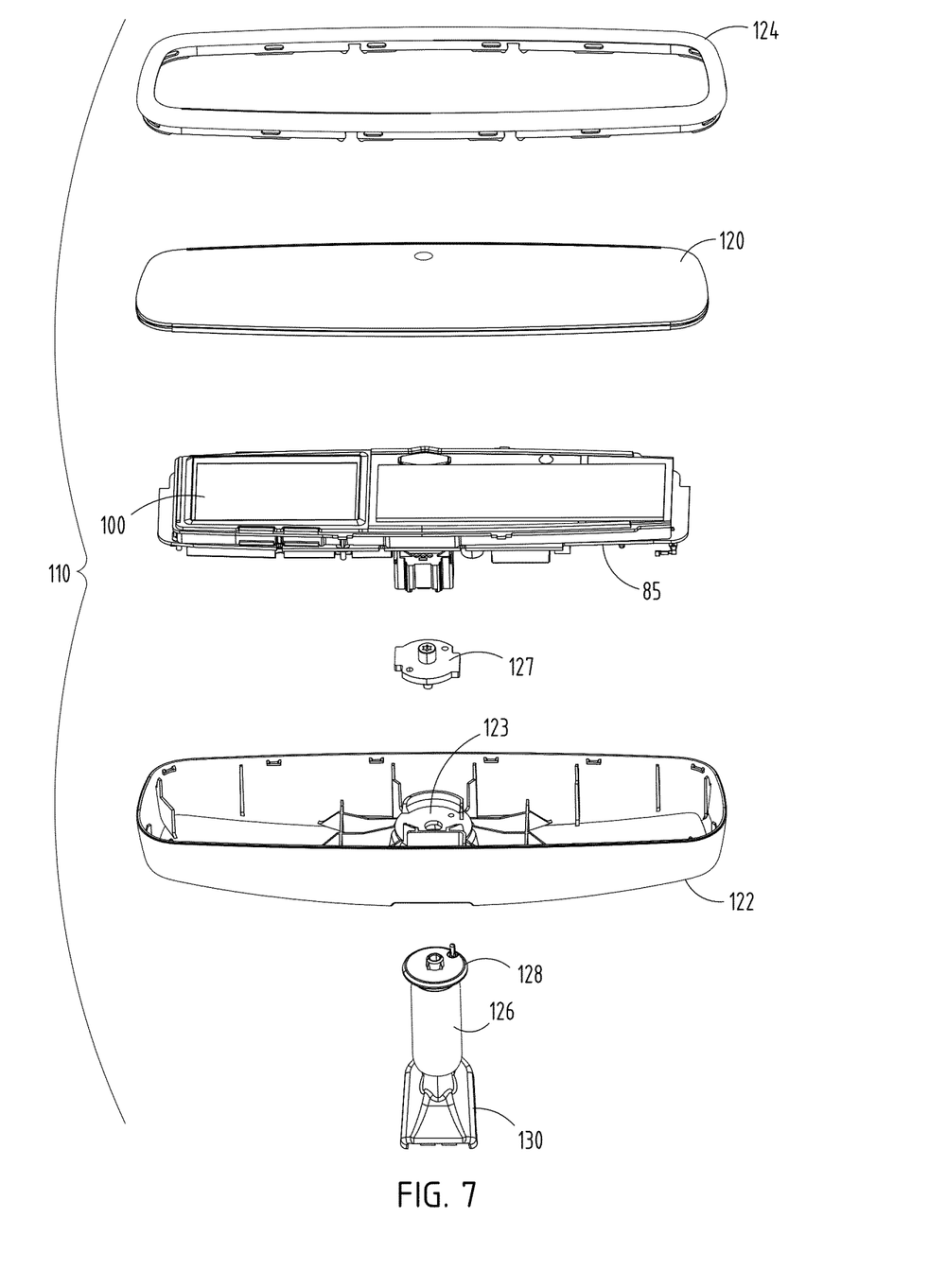
FIG. 7 is an exploded perspective view of a rearview assembly constructed according to an embodiment of the present invention.
Figure 8:
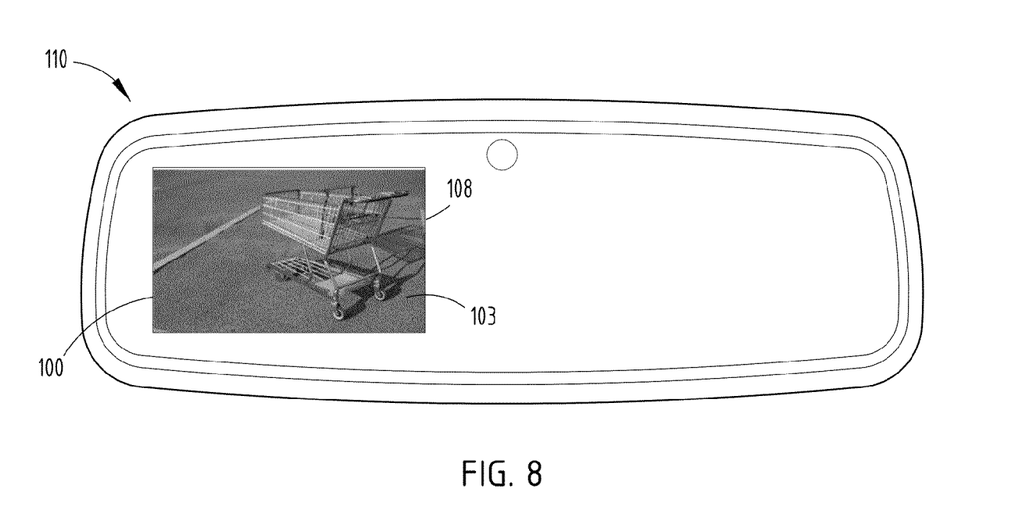
FIG. 8 is an elevational view of the rearview assembly shown in FIG. 1 with the display displaying video images.
Figure 9:
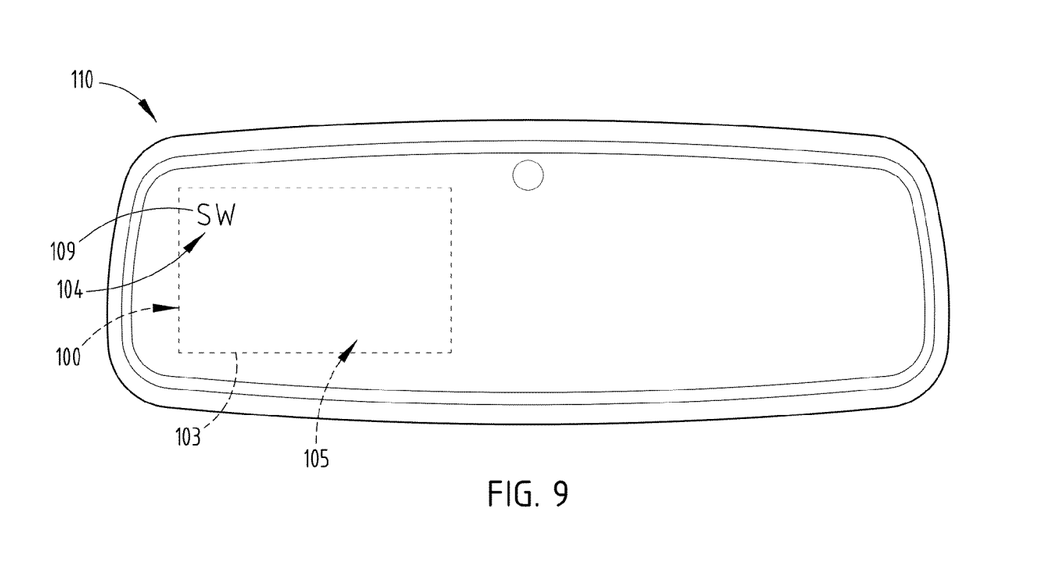
FIG. 9 is an elevational view of the rearview assembly shown in FIG. 1 with the display displaying a compass heading.

Rearview assemblies, such as that shown in FIGS. 7-9, may include displays for displaying video images that are received from cameras positioned on or within the vehicle. Such cameras may capture images of interior or exterior scenes. Such exterior scenes may be scenes to the rear or blindspots of the vehicle. If a rearward-facing camera is provided, video images 108 captured by the camera may be displayed on display 100 when the vehicle is in reverse gear as shown in FIG. 8. This allows a driver, while making a reversing maneuver, to look to one single location to view not only a rearward scene provided by a rearview mirror, but also of a rearward scene that may not otherwise be visible in the view provided by the mirror. If blindspot-facing cameras are employed, the video images they capture may be displayed by display 100 when the driver activates a turn signal to the corresponding side of the camera whose images are displayed.

Because the reverse camera display and blindspot camera display features are only activated during specific driving maneuvers, it is advantageous to position display 100 behind a mirror element 120 that is partially reflective and partially transmissive (i.e., "transflective") in at least the region in front of display 100 such that when display 100 is not displaying video images, it is not visible to the driver. Such a transflective mirror element allows the entire area of mirror element 120 to be reflective so that it may be more effectively used as a rearview mirror during all other driving or parking maneuvers. Suitable mirror elements are known and described in U.S. Pat. Nos. 6,356,376, 6,700,692, and 7,502,156, and United States Publication Application No. US 2009/0096937 A1, the entire disclosures of which are incorporated herein by reference.

As shown in FIG. 9, display 100 of rearview assembly 110 may also display other select information 109, so as to not require separate and costly additional display devices to be provided. Such select information may be displayed in the form of alphanumeric characters or graphic symbols. Examples of such select information include compass headings, external temperature, warnings related to object detection in blindspots, forward or rearward areas, pedestrian/animal detection warnings, driver alertness/impairment warnings, lane departure warnings, adaptive cruise control status, headway monitoring and warning, forward collision warning, emergency braking, traffic sign/speed sign recognition indications, range estimation, passenger air bag activation status, and tire inflation warnings. Some of such select information may be displayed over the full display as disclosed in United States Publication Application No. US 2010/0201896 A1, the entire disclosure of which is incorporated by reference.

The above types of select information may be displayed at times when video information is not displayed. Further, such select information may be displayed on only a small portion of the display. In this case, it may be advantageous to only backlight that small portion of the display without backlighting the remaining portion. Without such selective backlighting, the entire display area is backlit and the display is visible over its entire surface even though only a small portion actually displays the select information. Thus, by only backlighting the portion of the display that displays the select information, only that portion of the display would be visible. Not only is this more ascetically pleasing, but the mirror appears more reflective over that non-used remaining portion of the display, particularly during nighttime driving. Further, by activating only those LEDs associated with the select portion of the display, power consumption is lowered, thereby reducing heat generation, which would otherwise persist for long periods of driving.

Although it has been proposed to use selective backlighting for such displays when using direct backlighting (see, for example, United States Publication Application No. US 2009/0096937 A1 and United States Publication Application No. US 2010/0045899 A1, the entire disclosures of which are incorporated herein by reference), selective backlighting has not been previously proposed for displays using edge-lit backlighting because even though only some of the LEDs are activated, light emitted from those LEDs still propagates through the entire light guide and thereby backlights undesired portions of the display element. Nevertheless, edge-lit backlighting has several advantages over direct backlighting such as greater ability to obtain a specific color for the displayed select information 109, greater uniformity of backlighting, a thinner display, and fewer LEDs resulting in lower cost, less power consumption, and lower heat generation.

The embodiments described herein overcome the above-mentioned problems associated with selective backlighting of a display having an edge-lit backlight assembly. In particular, according to one embodiment shown in FIG. 6, a display 100 is provided that comprises: a display element 102 having a display area 103 from which information is displayed, a select portion 104 of the display area for displaying select information; and an edge-lit backlight assembly 30 for backlighting display element 102. Edge-lit backlight assembly 30 comprises: a light guide 40 having a first segment 50 and a second segment 70, where first segment 50 backlights the select portion 104 of the display area 103 and second segment 70 backlights a remaining portion 105 of the display area; a first LED 80 disposed along an edge 52 of first segment 50 such that light emitted from first LED 80 propagates through first segment 50 and backlights the select portion 104 of the display area; and a plurality of second LEDs 90 disposed along an edge 72 (or edges 72 and 74) of second segment 70 such that light emitted from the second LEDs 90 propagates through second segment 70 and backlights the remaining portion 105 of the display area 103. First segment 50 of light guide 40 is at least partially optically isolated from second segment 70 such that light emitted from first LED 80 is at least partially blocked from propagating through second segment 70 and thereby at least partially blocked from backlighting the remaining portion 105 of the display area 103. As will be described further below, an additional LED associated with first segment 50 may be provided.

Figure 6:
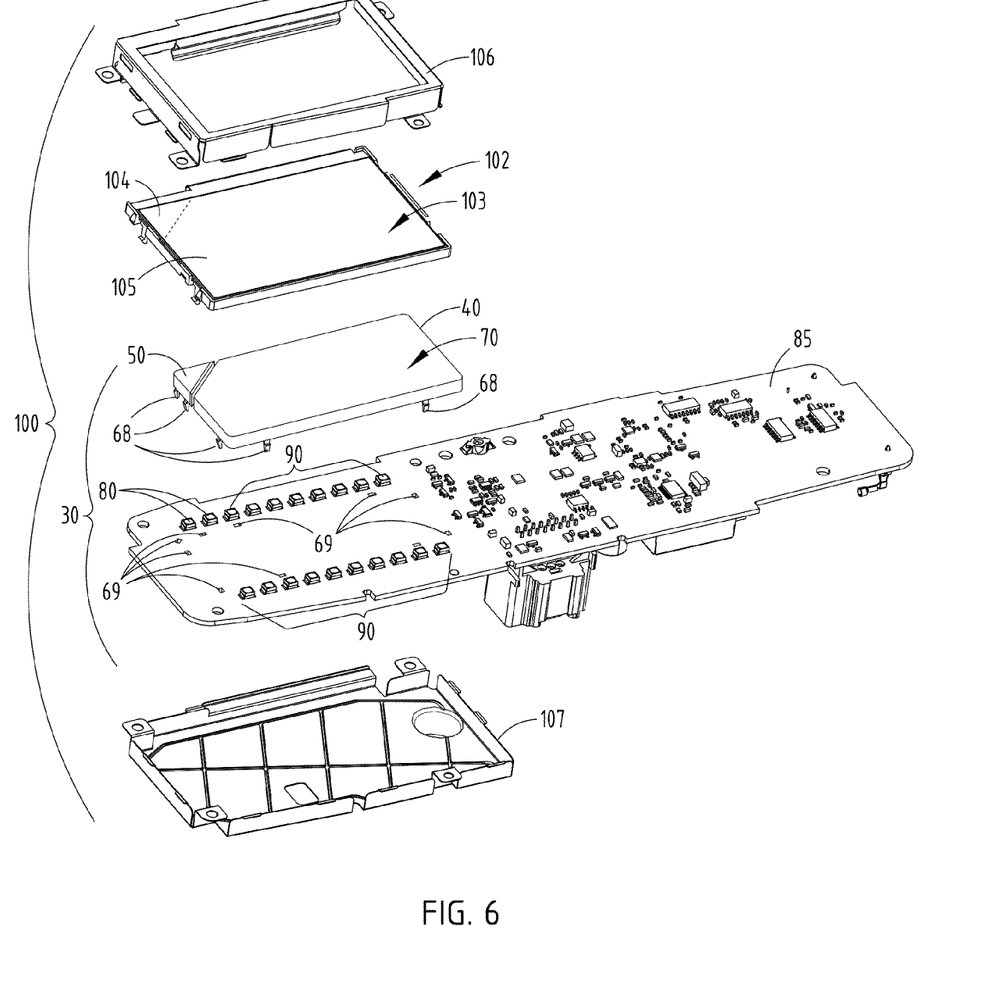
FIG. 6 is an exploded perspective view of a display constructed according to an embodiment of the present invention.

Display 100 may further include a circuit board 85 on which LEDs 80 and 90, light guide 40, and display element 102 are mounted. Other circuit components for driving the display and energizing the LEDs may also be mounted on circuit board 85. Display 100 may further include a front shield 106 and a back shield 107, which shield other electronic components from electromagnetic interference originating from display 100 and its associated electronics.

By providing such a display 100, video images may be displayed over the full display area 103 of display element 102. When used in a vehicle, the display may be configured so that, when video images are displayed over the full display area, at least one first LED 80 and the plurality of second LEDs 90 are energized to backlight all of the display area 103. Further, when the select information is displayed on the select portion 104 of the display area 103, at least one of the first LEDs 80 is energized to backlight the select portion 104 while the plurality of second LEDs are de-energized such that the remaining portion 105 is not backlit. The video images may be obtained from a camera having a field of view to the rear of the vehicle. Further, the video images may be displayed when the vehicle is in reverse gear.

Because it is preferable to backlight a video display with white light in order to provide a full color video display, at least with respect to edge-lit backlighting, each of the plurality of second LEDs 90 preferably emits white light. Also the at least one first LED 80 also preferably emits white light. It is contemplated that any form of white-light-emitting LEDs could be employed including those using phosphors and those using multiple colored LED chips such as red, green, and blue (RGB) LED chips. The at least one first LED 80 may include a white-light-emitting LED 82 and another LED 84 that emits light of a non-white color. This would be desirable if phosphor-type LEDs were used for second LEDs 90, in which case LED 82 would also be a phosphor-type LED for purposes of uniformity of color, and LED 84 could be provided if it was desired to backlight the select information with a different color. Although the select information may be displayed in a variety of colors using only white-light-emitting LEDs and color filtering by the display element, it may be desirable to use a non-white backlight color to obtain a color not otherwise available through such display element filtering, such as a more saturated color. This may be desirable when attempting to match the color of the displayed select information to the color of other displays in the vehicle.

As an alternative, the at least one first LED 80 may include a white-light-emitting LED of the RGB type, such that the red, green or blue LED chip contained therein may be independently activated such that the LED outputs that particular color or a color resulting from a mixing of the colors when combinations of the LED chips are activated. Further, by supplying varying levels of current to the different LED chips, various colors may be selected. Thus, the at least one first LED 80 may be controlled to emit either white light or light of another color. This can be beneficial when displaying warnings of varying degrees of danger such as yellow for a proximate object presenting a possible danger of collision and red for a proximate object presenting an imminent danger of collision.

As shown in FIG. 7, display 100 may be provided in a rearview assembly 110. Such a rearview assembly 110 may include a mirror element 120 that is secured in a housing 122 by a bezel 124. As discussed above, mirror element 120 may be transflective so as to hide display 100 when not operating (or at least portions thereof when display 100 only displays in select area 104) and for allowing display 100 to be seen when operating. The transflective mirror element may also be electrochromic so as to reduce glare from the headlamps of trailing vehicles as viewed by the driver. As shown, housing 122 is connected to a mount 126 by means of a mounting fastener 127, which is secured to portions of a mounting end 128 of mount 126 that extend through a hub 123 of housing 122. Mount 126 may include a mounting mechanism 130 that may be mounted to a vehicle windshield or mount 126 may mount to the roof structure of the vehicle.

Although rearview assembly 110 is shown in FIG. 7 as including a bezel 124, rearview assembly 110 may be constructed with no bezel, in which case the edge of the glass of the mirror element may be ground to a rounded edge. If the mirror element is an electrochromic mirror element, a reflective (i.e., chrome) ring may be provided to hide a seal of the electrochromic mirror element. Examples of mirror elements having a reflective ring or a ground edge are disclosed in U.S. Pat. Nos. 7,324,261, 7,372,611, 8,004,741 and 8,169,684, United States Patent Application Publication No. US 2011/0317242 A1, and U.S. patent application Ser. Nos. 13/395,069, 13/470,147, 13/431,700, 13/271,745, the entire disclosures of which are incorporated herein by reference.

Referring back to FIGS. 1 and 2, additional details of light guide 40 are described herein. First segment 50 may include an outer first edge 52 along which first LED(s) 80 is disposed, an outer second edge 54 joining first edge 52 at an outer corner of light guide 40, and an inner third edge 55 joining second edge 54. Second edge 54 and third edge 55 join to form an acute angle. Third edge 55 extends substantially parallel to a corresponding inner edge 76 of second segment 70. Third edge 55 may also join first edge 52 such that first segment 50 is shaped as a triangle.

Figure 10:
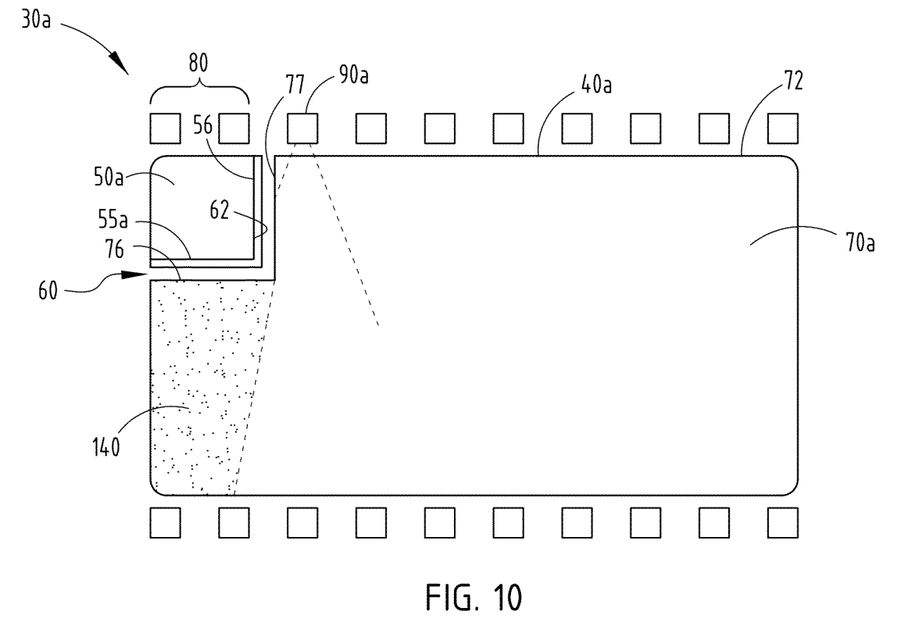
FIG. 10 is a top plan view of a segmented edge-lit backlight assembly constructed in accordance with another embodiment of the present invention.
Figure 11:
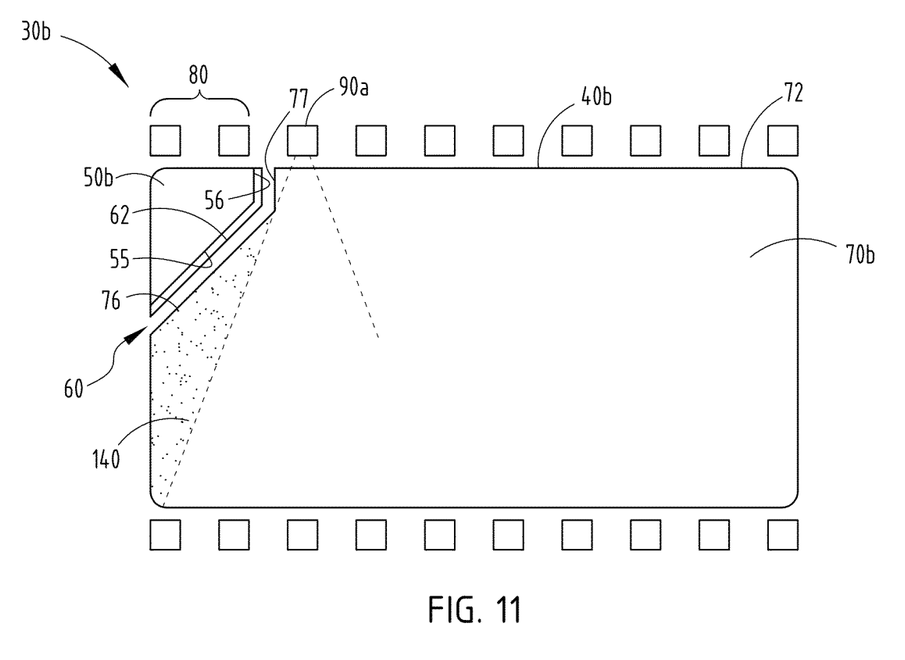
FIG. 11 is a top plan view of a segmented edge-lit backlight assembly constructed in accordance with another embodiment of the present invention.
Figure 12:
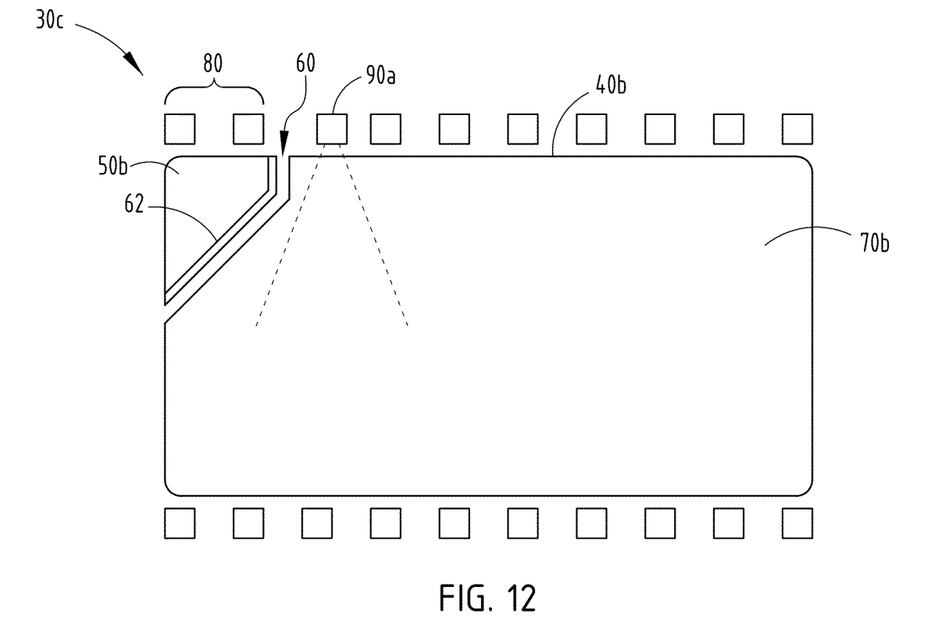
FIG. 12 is a top plan view of a segmented edge-lit backlight assembly constructed in accordance with another embodiment of the present invention.

Various mechanisms may be used to optically isolate or at least partially isolate first segment 50 from second segment 70. One mechanism is to provide a gap 60 between first segment 50 and second segment 60. Gap 60 is provided between third edge 55 of first segment 50 and the corresponding edge 76 of second segment 70. Alternatively, as shown in FIGS. 10-12 and described further below, first segment 50 may further include an inner fourth edge 56 extending between and joining first edge 52 and third edge 55 and extending substantially parallel to another corresponding inner edge 77 of second segment 70 such that first segment 50 is shaped as a quadrangle. Gap 60 is also provided between fourth edge 56 of first segment 50 and the corresponding edge 77 of second segment 70.

Second segment 70 includes a first edge 72, a second edge 73 joining first edge 72 at a corner of light guide 40, a third edge 74 joining second edge 73 at another corner of light guide 40, where third edge 74 is parallel to first edge 72, a fourth edge 75 joining third edge 74 at another corner of light guide 40, where fourth edge 75 is parallel to second edge 73, and a fifth edge 76 joining fourth edge 75 at an obtuse angle that is complementary of the acute angle formed by edges 54 and 55 of first segment 50 so that fifth edge 76 extends parallel to edge 55 of first segment 50. As illustrated in FIG. 1, first edge 72 and third edge 74 receive light from second LEDs 90.

Figure 3:
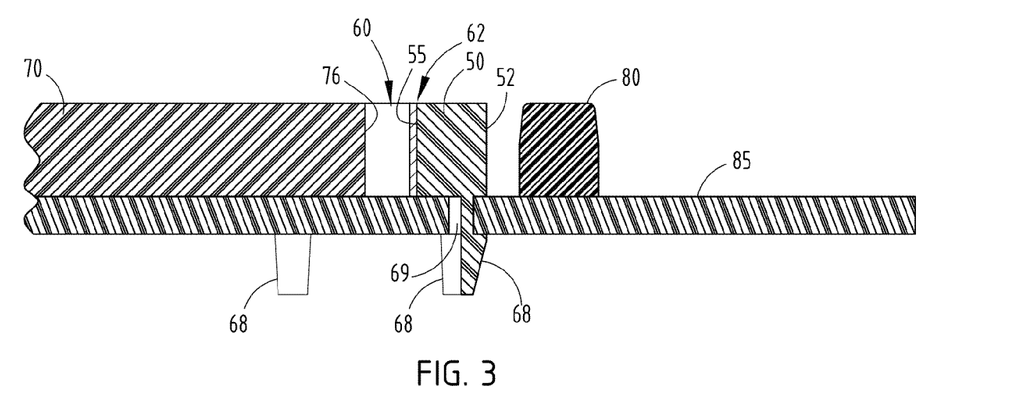
FIG. 3 is a cross-sectional view of a portion of the backlight assembly shown in FIG. 1 as taken along lines III-III.

By providing gap 60, most of the light propagating through first segment 50 is prevented from reaching second segment 70. To further block light from first segment 50 from reaching second segment 70, a light blocker 62 may be disposed on third edge 55 of first segment 50 as shown in FIG. 3. Such a light blocker may be reflective, absorptive or both. Such a light blocker 62 may, for example, include a coating of white paint, tape or surface treatment. Although this structure using white paint is sufficient to provide an acceptable appearance and a 9 point ANSI uniformity of 60% or greater, there is a discernible (in some viewing conditions) glow at the boundary of first segment 50 due to the high reflectivity of the white paint, which reflects the light from first LED(s) 80 backing into first segment 50. While this glow can be reduced by increasing the transmittance of blocker 62, this would also undesirably permit more light from first segment 50 to enter second segment 70. Accordingly, it is desirable to increase the absorption of light blocker 62 while decreasing reflectance. Thus, a slightly darker color paint, such as a cream or gray color, used as light blocker 62 is preferable. Light blocker 62 may include two or more layers of paint as shown in FIG. 4 where the first layer 63 may be a cream or gray color and the second or subsequent layers 64 may be a more reflective pure white or a more absorptive gray or black color with the former being more preferred as the white layer 64 reflects light from second segment 70, which reduces any darkness caused by the presence of gap 60. With more than two layers, varying colors may be used. It is also possible to change the color or hue of a color within the layer area based on the amount of color content of incident light.

Figure 5:
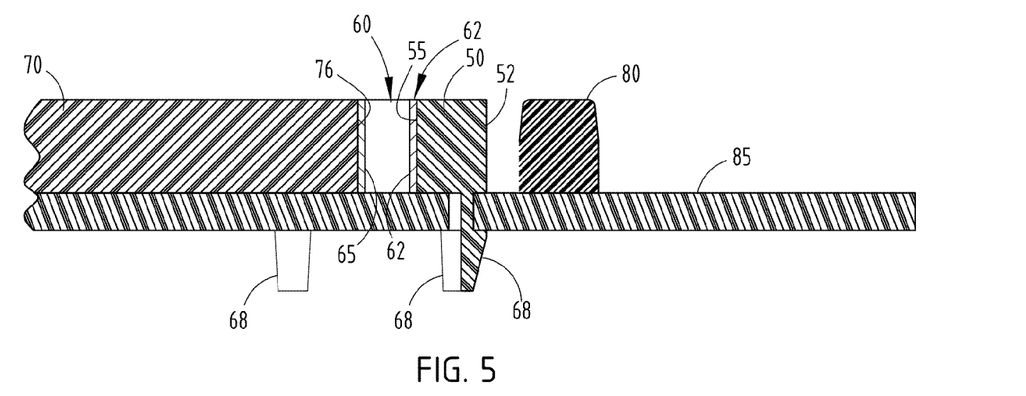
FIG. 5 is a cross-sectional view of a portion of the backlight assembly according to an alternate embodiment.

As shown in FIG. 5, it is also possible to add a coating 65 to edge 76 of second segment 70 to affect the optical properties at the boundary of second segment 70 at edge 76. When the display 100 is displaying video images over the full area 103 of the display, it can be beneficial to have white light propagating through second segment 70 to pass through gap 60 so that there is no dark line visible in the display.

Aside from having two segments, light guide 40 may otherwise be constructed in a conventional manner so as to uniformly illuminate the back of a display over the full area 103 of display. Accordingly, the surfaces of light guide 40 facing display element 102 may be textured or otherwise treated to achieve such uniformity. More specifically, a single piece of PMMA may be provided with optical features molded on the top and bottom surfaces. The optical features provided on the top surface are to provide uniform extraction of light over the surface area of the light guide. The optical features on the bottom surface are to diffuse and reflect the light inward so as to not exit the light guide in the wrong direction.

Although the above embodiment has been described as two separately formed segments 50 and 70 combining to form light guide 40, light guide 40 may also be formed as an integral member where a preformed light blocker is molded in place between the integral first and second segments so as to provide a similar optical property.

When the light guide 40 is provided as two physically separate segments, it is useful to take steps to minimize locational variance and to maintain a very tight air gap between the two segments. An air gap of 0.5 mm or less is desirable. Both segments 50 and 70 may include locating posts 68 (FIGS. 1-5) or features to prevent relative motion and provide positive feedback of correct positioning to the assembler. The locating posts 68 may allow segments 50 and 70 of light guide 40 to be snapped into a circuit board 85 (FIGS. 3-6), which has corresponding holes 69 to receive locating posts 68. Preferably, locating posts 68 depend downward from a bottom surface of light guide 40 at the edges thereof in a region that is not in the viewable area of the light guide. Alternative or additional locating features can be used that are provided in the plane of the light guide so as to mate with corresponding locating features on circuit board 85.

In order to provide a uniform backlighting appearance in modes where the entire viewing area 103 of display 100 is used for displaying video images, it may be desirable to provide separate lighting controls or use separate control methods for each backlight segment. Having a smaller area to backlight may require less light energy input into the smaller segment to achieve the same or similar light density as the larger segment. This can be achieved through methods which alter the current flowing through first LEDs 80, which illuminate the smaller first segment 50. For example, changing the value of a current limiting resistor is one way to use the same type of LED to light the smaller first segment 50 as the larger second segment 70. It may be preferred to use the same LED to light each segment regardless of size so as to provide as uniform backlighting as possible during full use of display area 103.

FIG. 10 shows a backlight assembly 30a having a light guide 40a constructed in accordance with another embodiment. In this embodiment, first segment 50a is shaped as a quadrangle, and more specifically as a rectangle. Accordingly, in addition to the aforementioned first, second and third edges 52, 54, and 55, first segment 50a further includes a fourth edge 56 that joins and extends between first edge 52 and third edge 55. The shape of second segment 70a is also modified to include a sixth edge 77 that joins and extends between first edge 72 and fifth edge 76 such that second segment 70a is shaped to accommodate the quadrangle-shaped first segment 50a while maintaining gap 60 of a substantially constant width. Light blocker 62 may thus also be applied to edge 56 of first segment 50a.

FIG. 11 shows a backlight assembly 30b having a light guide 40b constructed in accordance with another embodiment. In this embodiment, first segment 50b is shaped as a quadrangle. However, unlike the embodiment of FIG. 10, first segment 50b is not shaped as a rectangle as third edge 55 and fourth edge 56 join to form an obtuse angle rather than a right angle. Accordingly, in addition to the aforementioned first, second and third edges 52, 54, and 55, first segment 50b further includes a fourth edge 56 that joins and extends between first edge 52 and third edge 55. The shape of second segment 70b is also modified to include a sixth edge 77 that joins and extends between first edge 72 and fifth edge 76 such that second segment 70b is shaped to accommodate the quadrangle-shaped first segment 50b while maintaining gap 60 of substantially constant width. Light blocker 62 may thus also be applied to edge 56 of first segment 50b.

FIG. 12 shows a backlight assembly 30c constructed in accordance with another embodiment. In this embodiment, light guide 40b is the same as in the embodiment shown in FIG. 11. However, the backlight assembly of FIG. 12 differs in that LED 90*a* is positioned further away from gap 60 for reasons described further below.

Figure 13:
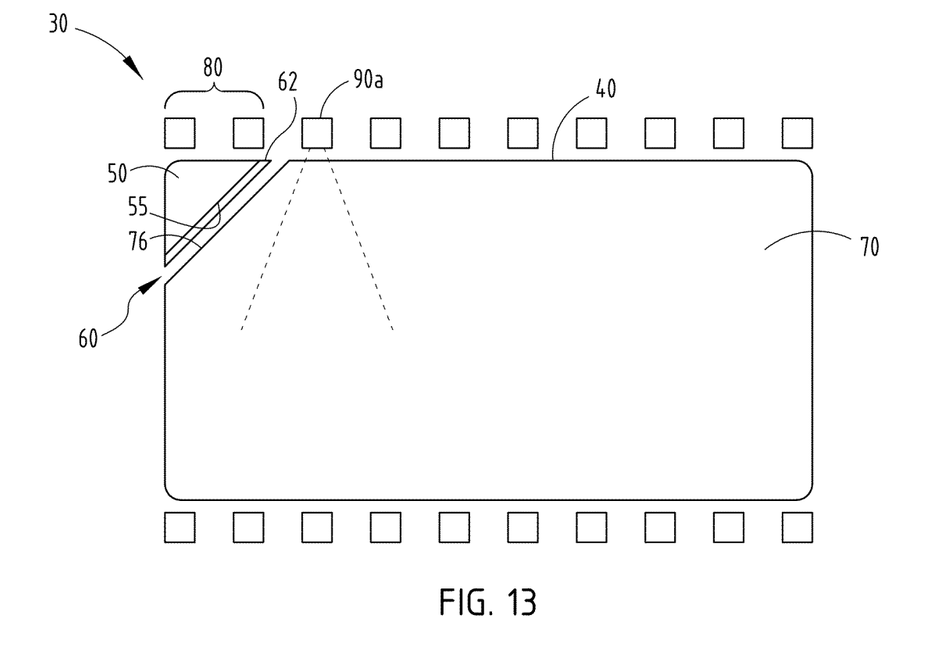
FIG. 13 is a top plan view of a segmented edge-lit backlight assembly constructed in accordance with the first embodiment of the present invention.

FIG. 13 shows the previously described first embodiment, which is reproduced for purposes of comparison to the other embodiments. In comparing the above embodiments, light guides 40 and 40*b* advantageously have the most of gap 60 extending at an angle relative to the sides of the light guide. This is advantageous, because gap 60 is much less visible when video images are displayed over the full display area 103. More specifically, where there is a gap in the lighted area, a dark line may exist, as much less light is being directed out of the backlight in that area. Due to the nature of the cameras used in rear camera displays for vehicles, and the wide view angle lenses employed therein, it is preferred to have any gap lines not occur at zero or 90 degrees relative to a horizontal line. Thus, the embodiments shown in FIGS. 11 and 12 are preferred over that of FIG. 10, while that of FIG. 13 is most preferred.

As illustrated in FIGS. 10-13, the shape of the first and second segments and the relative positioning of LEDs such as LED 90*a*, may affect the uniformity of the backlighting. For example, as illustrated in FIGS. 10 and 11, light from LED 90*a*, may be partially blocked by the fourth edges 56 of first segment 50 so as to cast shadows 140. Although light from LEDs on the other side of second segment 70 reduces the impact of the shadowing, such shadows may be noticeable to a driver. To further reduce or eliminate the impact of such shadows 140, either the fourth edge 56 of first segment 50 may be eliminated as in the embodiment of FIG. 13 or reduced in size as in the embodiment of FIG. 11, or LED 90*a* may be moved further away from gap 60 and fourth edge 56 as in the embodiment of FIG. 12.

Referring back to FIG. 6, circuit board 85 with holes 69, and LEDs 80 and 90 are preferably disposed to allow interchangeability of various light guides. For example, if a rearview assembly is to be made that does not display select information 109, a single-segment light guide may be snapped into circuit board 85 without further modification.

Figure 14:
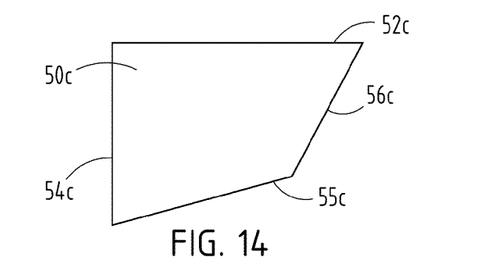
FIG. 14 is a top plan view of a first segment according to another embodiment.

FIG. 14 shows an example of a first segment 50*c* according to another embodiment. First segment 50*c* has the advantage that none of the edges (55*c* or 56*c*) that face the second segment are vertical. Also, unlike the triangular first segment 50 described above, the embodiment in FIG. 14 not only uses a second angle between edges 55*c* and 56*c* that does not cause edge 56*c* to be vertical, but is steeper so the first segment does not extend so far into the middle of the display. In the other embodiments the vertical line between segments can be noticeable. However, the edges between segments preferably are not extended at the same angle because the first segment may otherwise extend into the middle portion of the display, which may result in (1) the smaller segment being too large, and/or (2) the smaller segment blocking too many of the LEDs. Also, with this design, the first segment can include LEDs of various colors since there will be room on the board for more than an RGB LED and white LED along edges 52*c* and/or 54*c*. For purposes of example only, the dimensions of edges 52*c* and 54*c* may be about 26 mm and 19 mm, respectively, while the point where edges 55*c* and 56*c* intersect may be 11 mm from the upper edge 52*c* and 20 mm from edge 54*c*.

It should further be appreciated that multiple displays may be provided in a vehicle accessory such as disclosed in United States Publication Application No. US 2010/0201816 A1, the entire disclosure of which is incorporated herein by reference.

Figure 15:
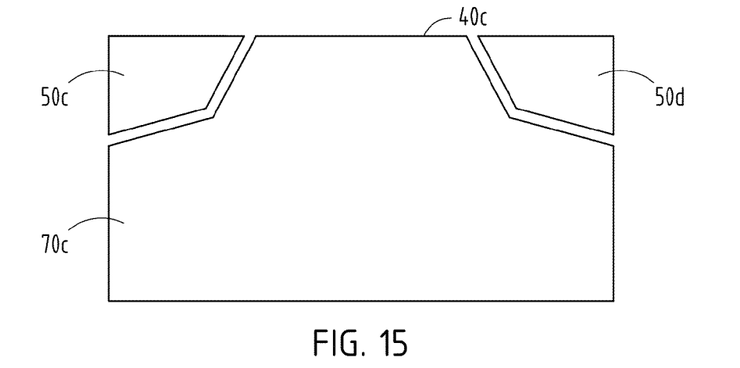
FIG. 15 is a top plan view of a light guide according to another embodiment.
Figure 16:
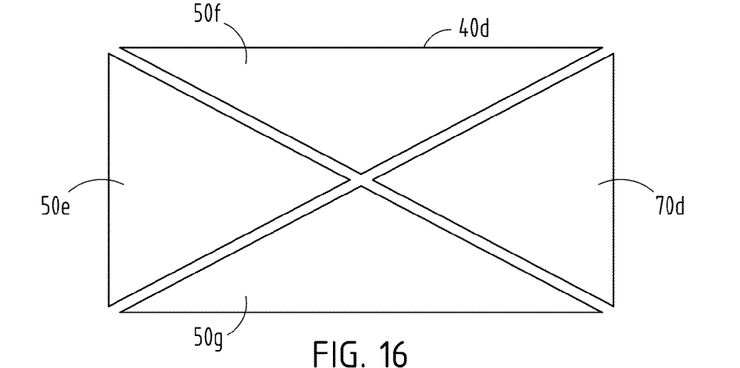
FIG. 16 is a top plan view of a light guide according to another embodiment.
Figure 17:
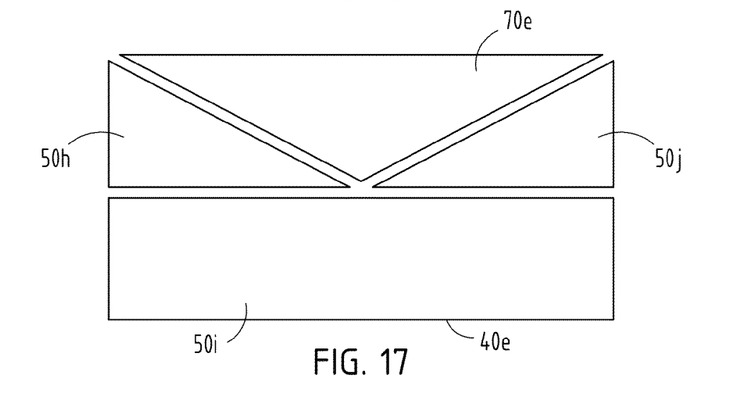
FIG. 17 is a top plan view of a light guide according to another embodiment.

Although the above embodiments have been described using a light guide 40 with two segments 50 and 70 to backlight areas 104 and 105 of display element 102, multiple smaller segments like first segment 50 may be provided to allow independent backlighting of additional areas of display element 102. Examples of light guides having multiple smaller segments are shown in FIGS. 15, 16, and 17. In the embodiment shown in FIG. 15, light guide 40*c* includes two first segments 50*c* and 50*d* at upper corners of the display with a second segment 70*c* having a complementary shape where both segments 50*c* and 50*d* have shapes similar to that shown in FIG. 14.

In the embodiment shown in FIG. 16, light guide 40*d* includes three first segments 50*e*, 50*f*, and 50*g* and a second segment 70*d*. Each of the segments in FIG. 16 may be triangular with apexes joining near the center of the display.

In the embodiment shown in FIG. 17, light guide 40*e* includes three first segments 50*h*, 50*i*, and 50*j* and a second segment 70*e*. First segment 50*i* may be rectangular and span the width of the display in order to display textual messages. Each of the segments 50*h*, 50*j*, and 70*e* may be triangular with apexes joining near the center of the display. The number, size and shape of the various segments may be varied and defined by the overall content of the information intended to be displayed in that area of the display (e.g., a compass heading may dictate a small portion of the display is used, while video may dictate that the whole display area is used).

When embodied in a rearview assembly, the segmented light guide may be used with a single display as described above, or with multiple displays provided in the rearview assembly, which may be separately operated or operated in unison to provide the appearance of a single display across substantially the entire area of the rearview assembly viewing area such as those disclosed in U.S. Patent Application Publication No. US 2010/0201816 A1, the entire disclosure of which is incorporated herein by reference. Further, the segmented light guide could be used with a single display that is configured to display images across substantially the entire area of the rearview assembly viewing area.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An edge-lit backlight assembly for backlighting a display, comprising:

a light guide having a first segment and a second segment disposed within a common plane;

a first light source disposed along an edge of said first segment of said light guide such that light emitted from said first light source propagates through said first segment;

a second light source disposed along an edge of said second segment of said light guide such that light emitted from said second light source propagates through said second segment, wherein said first segment of said light guide is at least partially optically isolated from said second segment such that light emitted from said first light source is at least partially blocked from propagating through said second segment; and wherein said first segment includes an outer first edge along which said first light emitting diode is disposed, an outer second edge joining said first edge at an outer corner of said light guide, and an inner third edge joining said second edge, wherein said second and third edges join to form an acute angle, and wherein said third edge extends substantially parallel to a corresponding inner edge of said second segment.

2. The edge-lit backlight assembly of claim 1, wherein said first segment of said light guide is at least partially optically isolated from said second segment by a gap provided therebetween.

3. The edge-lit backlight assembly of claim 2, wherein said first segment includes an opposed edge that opposes said gap and wherein a light blocker is disposed along said opposed edge of said first segment.

4. The edge-lit backlight assembly of claim 1, wherein said third edge also joins said first edge such that said first segment is shaped as a triangle.

5. The edge-lit backlight assembly of claim 1, wherein said first segment further includes an inner fourth edge extending between and joining said first and third edges and extends substantially parallel to another corresponding inner edge of said second segment such that said first segment is shaped as a quadrangle.

6. The edge-lit backlight assembly of claim 1, wherein a gap is provided between said third edge of said first segment and said corresponding edge of said second segment.

7. The edge-lit backlight assembly of claim 6, wherein a light blocker is disposed on said third edge of said first segment.

8. The edge-lit backlight assembly of claim 6, wherein a light blocker is disposed on said corresponding edge of said second segment.

9. A display, comprising:
a display element having a display area from which information is displayed, a select portion of said display area for displaying select information; and
an edge-lit backlight assembly for backlighting said display element, said edge-lit backlight assembly comprising:
a light guide having a first segment and a second segment, where said first segment backlights said select portion of said display area and said second segment backlights a remaining portion of said display area;
a first light emitting diode disposed along an edge of said first segment of said light guide such that light emitted from said first light emitting diode propagates through said first segment and backlights said select portion of said display area; and
a plurality of second light emitting diodes disposed along an edge of said second segment of said light guide such that light emitted from said second light emitting diodes propagates through said second segment and backlights said remaining portion of said display area,
wherein said first segment of said light guide is at least partially optically isolated from said second segment such that light emitted from said first light emitting diode is at least partially blocked from propagating through said second segment and thereby at least partially blocked from backlighting the remaining portion of said display area.

10. The display of claim 9, wherein video images are displayed over the full display area of said display element.

11. The display of claim 9, wherein the select information includes at least one of: an alphanumeric character and graphic symbol.

12. The display of claim 9, wherein said display element is a liquid crystal display.

13. The display of claim 9, wherein said first segment of said light guide is at least partially optically isolated from said second segment by a gap provided therebetween.

14. The display of claim 13, wherein said first segment includes an opposed edge that opposes said gap and wherein a light blocker is disposed along said opposed edge of said first segment.

15. A display for a vehicle, comprising:
a display element having a display area from which video images are displayed over the full display area, a select portion of said display area for displaying select information; and
an edge-lit backlight assembly for backlighting said display element, said edge-lit backlight assembly comprising:
a light guide having a first segment and a second segment, where said first segment backlights said select portion of said display area and said second segment backlights a remaining portion of said display area;
at least one first light emitting diode disposed along an edge of said first segment of said light guide such that light emitted from said at least one first light emitting diode propagates through said first segment and backlights said select portion of said display area; and
a plurality of second light emitting diodes disposed along an edge of said second segment of said light guide such that light emitted from said second light emitting diodes propagates through said second segment and backlights said remaining portion of said display area,
wherein said first segment of said light guide is at least partially optically isolated from said second segment such that light emitted from said at least one first light emitting diode is at least partially blocked from propagating through said second segment and thereby at least partially blocked from backlighting the remaining portion of said display area,
wherein, when video images are displayed over the full display area, said at least one first light emitting diode and said plurality of second light emitting diodes are energized to backlight all of said display area, and
wherein, when the select information is displayed on said select portion of said display area, said at least one first light emitting diode is energized to backlight said select portion while said plurality of second light emitting diodes are de-energized such that the remaining portion is not backlit.

16. The display of claim 15, wherein the select information includes at least one of: an alphanumeric character and graphic indicia.

17. The display of claim 15, wherein the select information includes a compass heading.

18. The display of claim 15, wherein the video images are obtained from a camera having a field of view to the rear of the vehicle.

19. The display of claim 18, wherein the video images are displayed when the vehicle is in reverse gear.

20. The display of claim 15, wherein said display is a liquid crystal display.

21. The display of claim 15, wherein said at least one first light emitting diode includes a white-light-emitting light emitting diode and another light emitting diode that emits light of a non-white color.

22. The display of claim 21, wherein:
said plurality of second light emitting diodes emit white light,
when video images are displayed over the full display area, said white-light-emitting light emitting diode of said at least one first light emitting diode and said plurality of second light emitting diodes are energized to backlight all of said display area with white light, and when the select information is displayed on said select portion of said display area, another light emitting diode of said at least one first light emitting diode is energized to backlight said select portion with a non-white color while said plurality of second light emitting diodes and said white-light-emitting light emitting diode of said at least one first light emitting diode are de-energized such that the remaining portion is not backlit.

23. The display of claim 15, wherein said at least one first light emitting diode is controlled to emit either white light or light of another color.

24. A rearview assembly for a vehicle comprising the display of claim 15.

* * * * *